(12) United States Patent
Chang

(10) Patent No.: US 8,827,725 B2
(45) Date of Patent: Sep. 9, 2014

(54) CARD READER AND ELECTRONIC DEVICE HAVING MOVABLE CARD INSERTION MECHANISM

(71) Applicant: Wistron Corporation, New Taipei (TW)

(72) Inventor: Wen-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/085,397

(22) Filed: Nov. 20, 2013

(65) Prior Publication Data

US 2014/0080335 A1 Mar. 20, 2014

Related U.S. Application Data

(62) Division of application No. 13/469,491, filed on May 11, 2012, now Pat. No. 8,662,905.

(30) Foreign Application Priority Data

Nov. 30, 2011 (TW) .............................. 100144027 A

(51) Int. Cl.
*H01R 13/44* (2006.01)
*H01R 13/447* (2006.01)
*G06F 1/16* (2006.01)
*H01R 13/639* (2006.01)

(52) U.S. Cl.
CPC .............. *H01R 13/44* (2013.01); *H01R 13/447* (2013.01); *H01R 13/639* (2013.01); *G06F 1/1658* (2013.01); *G06F 1/1684* (2013.01); *H01R 2201/06* (2013.01)
USPC .......................................... 439/131; 439/142

(58) Field of Classification Search
USPC ......... 439/135, 136, 137, 138–140, 142, 144, 439/131
See application file for complete search history.

(56) References Cited

U.S. PATENT DOCUMENTS

| | | | | | |
|---|---|---|---|---|---|
| 4,774,399 | A | * | 9/1988 | Fujita et al. | 235/441 |
| 4,847,711 | A | * | 7/1989 | Inoue | 360/96.51 |
| 5,199,888 | A | * | 4/1993 | Condra et al. | 439/142 |
| 5,331,506 | A | * | 7/1994 | Nakajima | 361/679.58 |
| 5,483,419 | A | * | 1/1996 | Kaczeus et al. | 361/679.39 |
| 5,534,888 | A | * | 7/1996 | Lebby et al. | 345/672 |

(Continued)

FOREIGN PATENT DOCUMENTS

TW 471729 U 1/2002
TW M408829 U 8/2011

*Primary Examiner* — Ross Gushi
(74) *Attorney, Agent, or Firm* — Muncy, Geissler, Olds & Lowe, P.C.

(57) ABSTRACT

A card reader is disposed in a case body of an electronic device for connecting an electronic card. The card reader includes an electrical connection socket, at least one guiding member, at least one guiding rail and a cover. The electrical connection socket is disposed in the case body for inserting an electrical connector of the electronic card thereinto. The guiding member is disposed in the case body and provides a guiding slot extending along a guiding direction. The guiding direction is parallel to a direction in which the electrical connector is inserted into the electrical connection socket. The guiding rail includes a sliding portion sliding in the guiding slot and a lower support portion extending from the sliding portion for guiding the electronic card to pass through the insertion hole of the case body. The cover is pivoted to the guiding rail and for closing the insertion hole.

1 Claim, 15 Drawing Sheets

(56) References Cited

U.S. PATENT DOCUMENTS

| | | | |
|---|---|---|---|
| 5,557,499 A * | 9/1996 | Reiter et al. | 361/679.39 |
| 5,559,672 A * | 9/1996 | Buras et al. | 361/679.32 |
| 5,574,625 A * | 11/1996 | Ohgami et al. | 361/679.09 |
| 5,598,319 A * | 1/1997 | Lee | 361/679.33 |
| 5,709,156 A * | 1/1998 | Gevaert et al. | 108/50.02 |
| 5,738,536 A * | 4/1998 | Ohgami et al. | 439/142 |
| 5,793,619 A * | 8/1998 | Deguchi | 361/814 |
| 5,815,379 A * | 9/1998 | Mundt | 361/679.55 |
| 5,815,479 A * | 9/1998 | Lee | 720/647 |
| 5,912,870 A * | 6/1999 | Kanno et al. | 720/643 |
| 5,951,310 A * | 9/1999 | Seto et al. | 439/142 |
| 5,975,927 A * | 11/1999 | Giles | 439/131 |
| 6,002,581 A * | 12/1999 | Lindsey | 361/679.55 |
| 6,028,267 A * | 2/2000 | Byrne | 174/59 |
| 6,038,125 A * | 3/2000 | Anzai | 361/609 |
| 6,085,667 A * | 7/2000 | Gevaert et al. | 108/50.02 |
| 6,120,322 A * | 9/2000 | Ho et al. | 439/541.5 |
| 6,267,608 B1 * | 7/2001 | Yagi | 439/142 |
| 6,269,005 B1 * | 7/2001 | Tung et al. | 361/737 |
| 6,290,517 B1 * | 9/2001 | Anderson | 439/131 |
| 6,290,518 B1 * | 9/2001 | Byrne | 439/131 |
| 6,343,945 B1 * | 2/2002 | Liikanen | 439/160 |
| 6,368,122 B2 * | 4/2002 | Billman | 439/138 |
| 6,377,451 B1 * | 4/2002 | Furuya | 361/679.32 |
| 6,411,583 B1 * | 6/2002 | Yamamoto et al. | 720/647 |
| 6,421,247 B1 * | 7/2002 | Fuchimukai | 361/759 |
| 6,435,729 B1 * | 8/2002 | Thevenod et al. | 385/76 |
| 6,437,976 B1 * | 8/2002 | Wolff et al. | 361/679.57 |
| 6,454,580 B1 * | 9/2002 | Hwang | 439/138 |
| 6,558,175 B1 * | 5/2003 | Yu | 439/138 |
| 6,679,710 B2 * | 1/2004 | Saito et al. | 439/142 |
| 6,705,890 B2 * | 3/2004 | Kitou et al. | 439/528 |
| 6,705,891 B1 * | 3/2004 | Lin | 439/528 |
| 6,724,622 B2 | 4/2004 | Liao | |
| 6,757,160 B2 * | 6/2004 | Moore et al. | 361/679.55 |
| 6,788,543 B2 * | 9/2004 | Yanagida | 361/727 |
| 6,875,041 B1 * | 4/2005 | Chang et al. | 439/347 |
| 6,979,209 B2 * | 12/2005 | Griepentrog | 439/131 |
| 7,048,556 B2 * | 5/2006 | Stanton et al. | 439/135 |
| 7,058,435 B2 * | 6/2006 | Yamazaki | 455/575.8 |
| 7,080,995 B2 * | 7/2006 | Cheng | 439/138 |
| 7,084,345 B1 * | 8/2006 | Chen et al. | 174/545 |
| 7,097,475 B2 * | 8/2006 | Cheng | 439/138 |
| 7,104,816 B1 * | 9/2006 | Wang | 439/136 |
| 7,104,817 B2 * | 9/2006 | Shiue et al. | 439/137 |
| 7,214,076 B1 * | 5/2007 | Sabo | 439/138 |
| 7,217,144 B1 * | 5/2007 | Cipolla et al. | 439/131 |
| 7,234,966 B2 * | 6/2007 | Choy | 439/541.5 |
| 7,307,846 B2 * | 12/2007 | Du | 361/728 |
| 7,309,016 B2 * | 12/2007 | Lev et al. | 235/472.01 |
| 7,327,566 B2 * | 2/2008 | Zhao | 361/679.33 |
| 7,350,219 B2 * | 3/2008 | Liao et al. | 720/647 |
| 7,371,089 B2 * | 5/2008 | Cheng | 439/159 |
| 7,374,437 B2 * | 5/2008 | Reid et al. | 439/131 |
| 7,374,439 B2 * | 5/2008 | Kodama et al. | 439/138 |
| 7,448,890 B2 | 11/2008 | Ting | |
| 7,448,898 B2 * | 11/2008 | Tae et al. | 439/367 |
| 7,458,830 B2 * | 12/2008 | Reid et al. | 439/131 |
| 7,466,555 B2 * | 12/2008 | Yamamoto | 361/737 |
| 7,483,262 B2 * | 1/2009 | Yin et al. | 361/679.01 |
| 7,554,802 B2 * | 6/2009 | Tsai | 361/679.33 |
| 7,561,420 B2 * | 7/2009 | Chueh et al. | 361/679.59 |
| 7,597,566 B2 * | 10/2009 | Peiker | 439/131 |
| 7,611,371 B2 * | 11/2009 | Guo | 439/367 |
| 7,618,272 B2 * | 11/2009 | Cheng | 439/159 |
| 7,654,835 B1 * | 2/2010 | Chiang | 439/137 |
| 7,667,983 B2 * | 2/2010 | Wang | 361/807 |
| 7,687,711 B2 * | 3/2010 | Kutaragi et al. | 174/50 |
| 7,704,085 B1 * | 4/2010 | Chang | 439/137 |
| 7,742,294 B2 * | 6/2010 | Gadau et al. | 361/679.43 |
| 7,766,676 B2 * | 8/2010 | Hsieh et al. | 439/136 |
| 7,817,003 B2 * | 10/2010 | Fullerton et al. | 335/306 |
| 7,837,484 B2 * | 11/2010 | Wu | 439/136 |
| 7,845,953 B2 * | 12/2010 | Brock et al. | 439/39 |
| 7,857,653 B2 * | 12/2010 | Fujita et al. | 439/367 |
| 7,866,991 B2 * | 1/2011 | Liu | 439/136 |
| 7,887,344 B2 * | 2/2011 | Ihara et al. | 439/136 |
| 7,959,449 B2 * | 6/2011 | Tracy et al. | 439/131 |
| 8,067,701 B2 * | 11/2011 | Keiper et al. | 174/356 |
| 8,072,746 B2 * | 12/2011 | Hung et al. | 361/679.41 |
| 8,079,867 B2 * | 12/2011 | Delpier et al. | 439/528 |
| 8,107,227 B2 * | 1/2012 | Long et al. | 361/679.01 |
| 8,155,715 B2 * | 4/2012 | Yang et al. | 455/575.3 |
| 8,164,891 B2 * | 4/2012 | Liu | 361/679.32 |
| 8,174,792 B2 * | 5/2012 | Yabashi et al. | 360/132 |
| 8,186,726 B2 * | 5/2012 | Zuo | 292/57 |
| 8,199,470 B2 * | 6/2012 | Yang | 361/679.02 |
| 8,254,105 B2 * | 8/2012 | Liu | 361/679.32 |
| 8,254,138 B2 * | 8/2012 | Ouyang | 361/752 |
| 8,259,445 B2 * | 9/2012 | Skillman et al. | 361/679.58 |
| 8,337,222 B2 * | 12/2012 | Hung et al. | 439/138 |
| 8,348,684 B2 * | 1/2013 | Ladouceur et al. | 439/131 |
| 8,363,386 B2 * | 1/2013 | Cheng et al. | 361/600 |
| 8,419,451 B2 * | 4/2013 | Kim | 439/136 |
| 8,419,459 B2 * | 4/2013 | Nihei et al. | 439/341 |
| 8,435,054 B2 * | 5/2013 | Liu | 439/142 |
| 8,449,315 B2 * | 5/2013 | Chiang | 439/372 |
| 8,496,487 B2 * | 7/2013 | Peng | 439/138 |
| 8,513,522 B2 * | 8/2013 | Liang | 174/66 |
| 2001/0001083 A1 * | 5/2001 | Helot | 439/131 |
| 2001/0003071 A1 * | 6/2001 | Mansutti et al. | 439/133 |
| 2001/0049214 A1 * | 12/2001 | Billman | 439/138 |
| 2002/0027771 A1 * | 3/2002 | Dong | 361/685 |
| 2002/0119697 A1 * | 8/2002 | Chan | 439/519 |
| 2005/0026481 A1 * | 2/2005 | Nishio et al. | 439/137 |
| 2005/0049016 A1 * | 3/2005 | Cho et al. | 455/575.1 |
| 2005/0124191 A1 * | 6/2005 | Stanton et al. | 439/135 |
| 2005/0202700 A1 * | 9/2005 | Kim | 439/137 |
| 2005/0257231 A1 * | 11/2005 | Hibi | 720/647 |
| 2005/0287852 A1 * | 12/2005 | Sugawara et al. | 439/135 |
| 2006/0046542 A1 * | 3/2006 | Obara et al. | 439/135 |
| 2006/0078326 A1 * | 4/2006 | Ariga | 396/419 |
| 2006/0085584 A1 * | 4/2006 | Chen et al. | 710/303 |
| 2006/0089028 A1 * | 4/2006 | Higham et al. | 439/136 |
| 2006/0261605 A1 * | 11/2006 | Ku et al. | 292/251.5 |
| 2007/0019389 A1 * | 1/2007 | Du | 361/728 |
| 2007/0259570 A1 * | 11/2007 | Moshayedi | 439/638 |
| 2008/0050953 A1 * | 2/2008 | Reid et al. | 439/131 |
| 2008/0064238 A1 * | 3/2008 | Reid et al. | 439/142 |
| 2009/0068867 A1 * | 3/2009 | Reid et al. | 439/131 |
| 2009/0109635 A1 * | 4/2009 | Chen et al. | 361/728 |
| 2009/0130875 A1 * | 5/2009 | Guo | 439/141 |
| 2009/0141445 A1 * | 6/2009 | Lu | 361/679.55 |
| 2009/0173534 A1 * | 7/2009 | Keiper et al. | 174/350 |
| 2009/0176391 A1 * | 7/2009 | Brock et al. | 439/136 |
| 2009/0231790 A1 * | 9/2009 | Chi | 361/679.6 |
| 2009/0262489 A1 * | 10/2009 | Lin et al. | 361/679.01 |
| 2009/0263994 A1 * | 10/2009 | Hsieh et al. | 439/136 |
| 2009/0270144 A1 * | 10/2009 | Yang et al. | 455/575.3 |
| 2010/0119924 A1 * | 5/2010 | Wang et al. | 429/98 |
| 2010/0128420 A1 * | 5/2010 | Li et al. | 361/679.01 |
| 2010/0210125 A1 * | 8/2010 | Wu | 439/136 |
| 2010/0227485 A1 * | 9/2010 | Fujita et al. | 439/136 |
| 2010/0240235 A1 * | 9/2010 | Hung et al. | 439/131 |
| 2010/0264671 A1 * | 10/2010 | Zuo | 292/57 |
| 2010/0279527 A1 * | 11/2010 | Liu | 439/136 |
| 2010/0309613 A1 * | 12/2010 | Zuo et al. | 361/679.01 |
| 2010/0317203 A1 * | 12/2010 | Tracy et al. | 439/131 |
| 2011/0104917 A1 * | 5/2011 | Chen et al. | 439/131 |
| 2011/0124210 A1 * | 5/2011 | Lai | 439/131 |
| 2011/0136355 A1 * | 6/2011 | Delpier et al. | 439/131 |
| 2011/0147036 A1 * | 6/2011 | Cheng | 174/59 |
| 2011/0157804 A1 * | 6/2011 | Chen et al. | 361/679.14 |
| 2011/0261519 A1 * | 10/2011 | Chiu et al. | 361/679.02 |
| 2012/0015535 A1 * | 1/2012 | Lin et al. | 439/136 |
| 2012/0069518 A1 * | 3/2012 | Hsu et al. | 361/679.58 |
| 2012/0156901 A1 * | 6/2012 | Ladouceur et al. | 439/77 |
| 2012/0162872 A1 * | 6/2012 | Liang | 361/679.01 |
| 2013/0084721 A1 * | 4/2013 | Lim | 439/135 |
| 2013/0137290 A1 * | 5/2013 | Chang | 439/377 |
| 2013/0244461 A1 * | 9/2013 | Munehiro et al. | 439/136 |
| 2014/0004729 A1 * | 1/2014 | Wong | 439/131 |

* cited by examiner

CARD READER AND ELECTRONIC DEVICE HAVING MOVABLE CARD INSERTION MECHANISM

CROSS-REFERENCE TO RELATED APPLICATIONS

This application is a Divisional of co-pending application Ser. No. 13/469,491 filed on May 11, 2012, for which priority is claimed under 35 U.S.C. §120; and this application claims priority of Application No. 100144027 filed in Taiwan, R.O.C. on Nov. 30, 2011 under 35 U.S.C. §119; the entire contents of which are hereby incorporated by reference.

BACKGROUND OF THE INVENTION

1. Technical Field

This disclosure relates to a card reader for an electronic card, and more particularly to a card reader having movable card insertion mechanism and an electronic device having the movable card insertion structure.

2. Related Art

An electronic card such as a PCMIA card, PC Express card, flash memory card (CF, SD, Memory Stick, xD-Picture), or micro-drive, has a flat contour and has an electrical connector disposed at a side edge.

For connecting the electronic card to an electronic device, the electronic device is typically equipped with a card reader of the corresponding specifications. For example, U.S. Pat. No. 6,724,622 discloses a card reader. The card reader includes an electrical connection socket and a guiding element disposed on a circuit board of the electronic device and the card reader is located corresponding to an insertion hole in the case body of the electronic device. A guiding channel is formed between the guiding element and the circuit board, for ensuring the insertion hole is in communication with the electrical connection socket. When an electronic card is inserted through the insertion hole, the guiding channel guides the electrical connector of the electronic card to be inserted into the electrical connection socket, so as to establish communication between the electronic card and the electronic device.

The guiding channel is formed between the guiding element and the circuit board, for guiding the electronic card to be inserted into the electrical connection socket in a right way. In the card reader, only the electrical connector is actually finally electrically connected with the electronic card, but for forming the aforementioned guiding channel, the electrical connection socket is disposed at a distance from the insertion hole, so the card reader occupies a large area on the circuit board, thus influencing the arrangement of other electronic parts.

The U.S. Pat. No. 7,448,890 discloses an electronic card and a card reader configuration, in which a width of the electrical connector of the electronic card is smaller than a width of the electronic card, but the guiding channel between the guiding element and the circuit board is still required to be larger in width than the electronic card. Although the width of the electrical connection socket of the card reader is reduced along with the width of the electrical connector, the card reader still occupies a large area on the circuit board.

SUMMARY

In the prior art, the card reader usually occupies a large area on the circuit board of the electronic device, thus influencing the arrangement of other electronic parts. Accordingly, this disclosure provides a card reader having movable card insertion mechanism and an electronic device having movable card insertion mechanism, thereby solving the problem of the card reader occupying a large area.

According to at least one embodiment of this disclosure, a card reader having movable card insertion mechanism is disposed in a case body of an electronic device and is adapted for connecting an electronic card. The electronic card has an electrical connector, and the case body has an insertion hole for the electrical connector to pass through to be connected to the card reader. The card reader includes an electrical connection socket, at least one guiding member, at least one guiding rail and a cover.

The electrical connection socket is disposed in the case body and is adapted for inserting the electrical connector, so as to electrically connect the electronic card to the electrical connection socket.

The guiding member is disposed in the case body and provides a guiding slot extending along a guiding direction. The guiding direction is parallel to a direction in which the electrical connector is inserted into or unplugged from the electrical connection socket. The guiding rail includes at least one sliding portion and a lower support portion. The sliding portion in disposed in the guiding slot in a slidable manner to slide to-and-fro along the guiding direction towards the insertion hole, and the lower support portion extends from the sliding portion and is for supporting the electronic card and guiding the electronic card to pass through the insertion hole. The cover is pivoted to the guiding rail, and for closing the insertion hole.

According to at least another embodiment of this disclosure, an electronic device having movable card insertion mechanism is provided for connecting an electronic card, where the electronic card has an electrical connector. The electronic device includes a case body, an electrical connection socket, at least one guiding member, at least one guiding rail, and a cover.

The case body has an insertion hole for the electrical connector to pass through. The electrical connection socket is disposed in the case body, and is adapted for inserting the electrical connector, so as to electrically connect the electronic card to the electrical connection socket.

The guiding member is disposed in the case body and provides a guiding slot extending along a guiding direction. The guiding direction is parallel to a direction in which the electrical connector is inserted into/unplugged from the electrical connection socket. The guiding rail includes at least one sliding portion and a lower support portion. The sliding portion is disposed in the guiding slot in a slidable manner to slide to-and-fro along the guiding direction towards the insertion hole, and the lower support portion extends from the sliding portion for supporting the electronic card and guiding the electronic card to pass through the insertion hole. The cover is pivoted to the guiding rail for closing the insertion hole.

The whole structure of the card reader is disposed close to an inner wall surface of the case body without reserving a large space for inserting the electronic card into the interior of the case body, still has the guide function as the guiding channel in the prior art, and reduces the space occupied by the card reader.

According to at least one embodiment of this disclosure, an electronic device having movable card insertion mechanism is further provided, which includes a case body, a rotary cover, an electrical connection socket and a guiding member.

The case body has a window for communicating an interior and an exterior of the case body. The rotary cover is pivoted to the case body and located at the window to be rotated to a closing state and an opening state. The rotary cover has an inner side surface and an outer side surface. In the closing state, the inner side surface faces the interior of the case body, and in the opening state, the inner side surface faces the exterior of the case body.

The electrical connection socket is disposed on the inner side surface of the rotary cover. The guiding member is disposed on the inner side surface of the rotary cover and provides a guiding slot. The electrical connection socket is disposed corresponding to the guiding slot.

When the rotary cover is rotated to the closing state, the position of the electrical connection socket is near an inner sidewall of the case body. Therefore, the area on the circuit board or the space inside the case body occupied by the electrical connection socket or the card reader can be reduced to the smallest area possible.

BRIEF DESCRIPTION OF THE DRAWINGS

This disclosure will become more fully understood from the detailed description given herein below for illustration only and thus not limitative of this disclosure, wherein.

DETAILED DESCRIPTION

Figure 1:
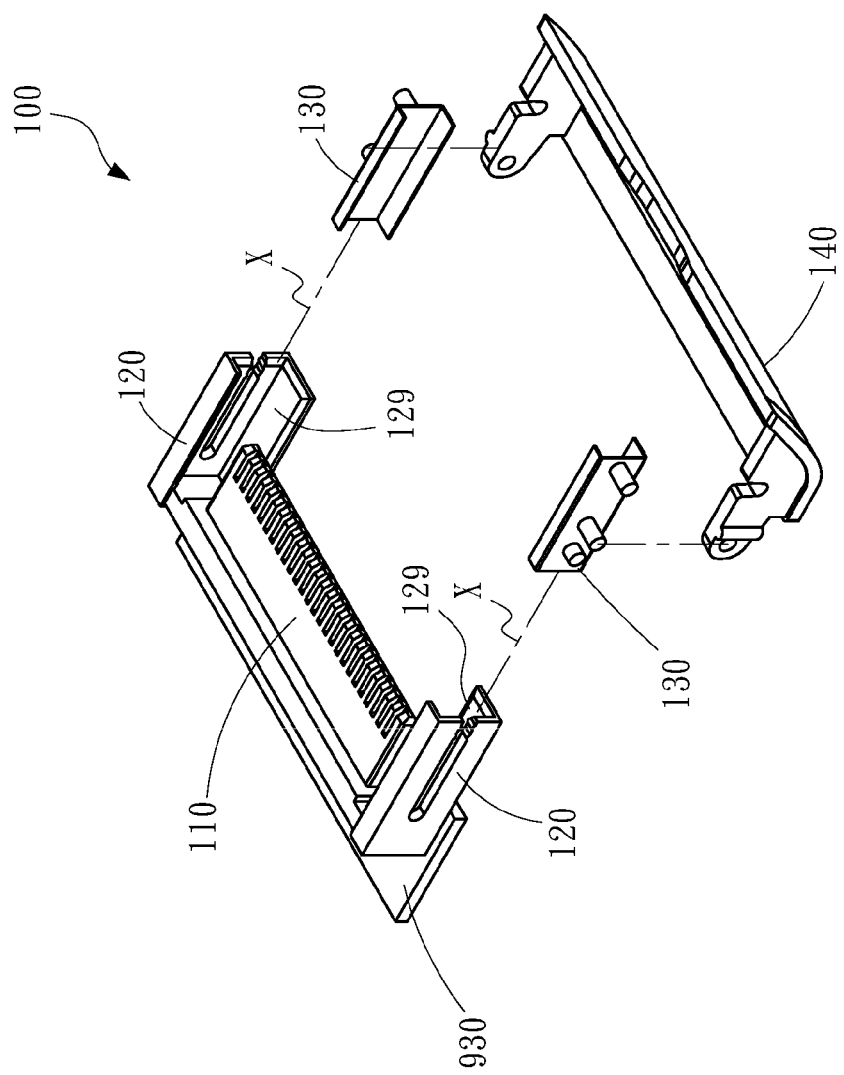
FIG. 1 is an exploded view of a card reader according to a first embodiment.
Figure 2:
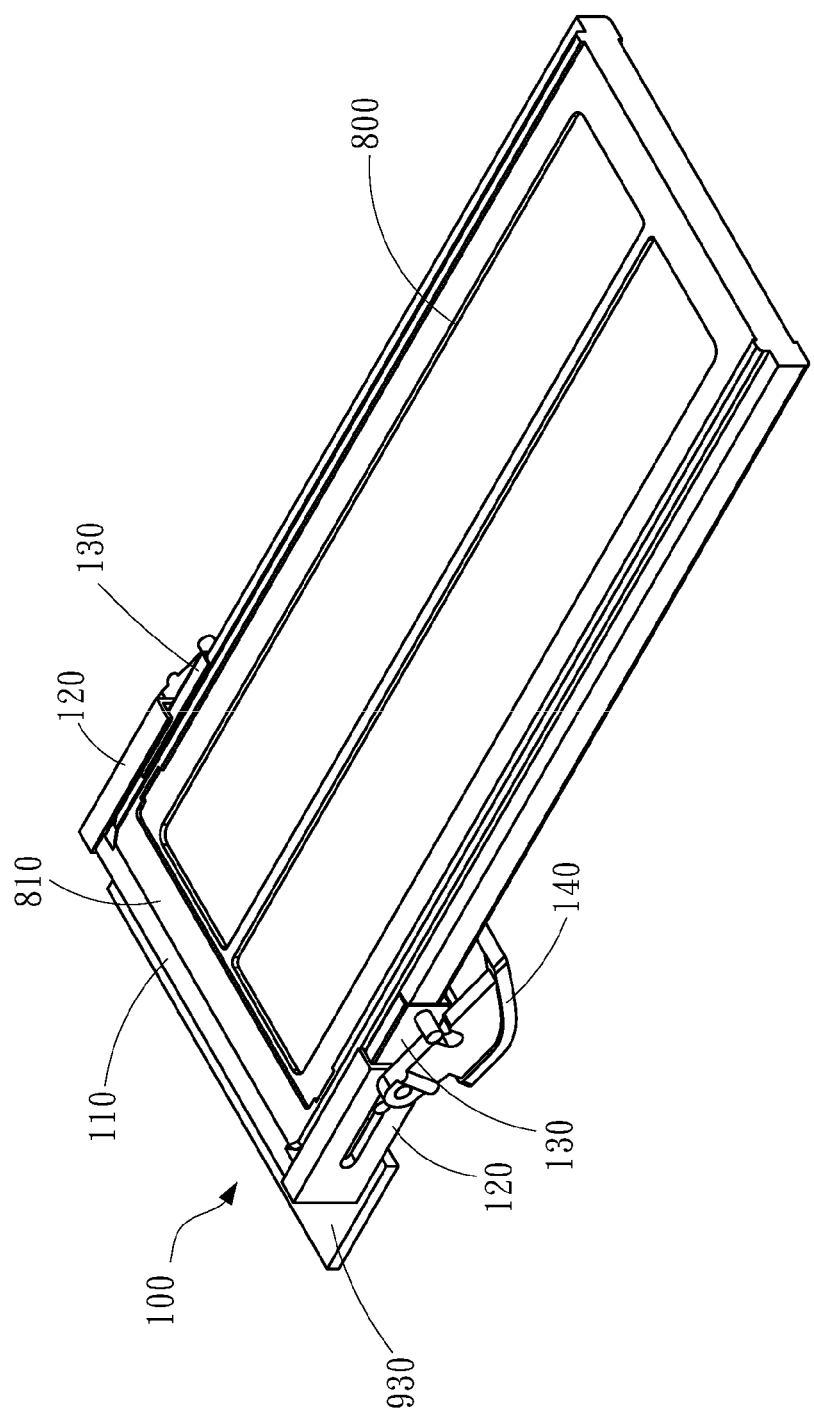
FIG. 2 is a perspective view of the card reader and an electronic card according to the first embodiment.
Figure 3:
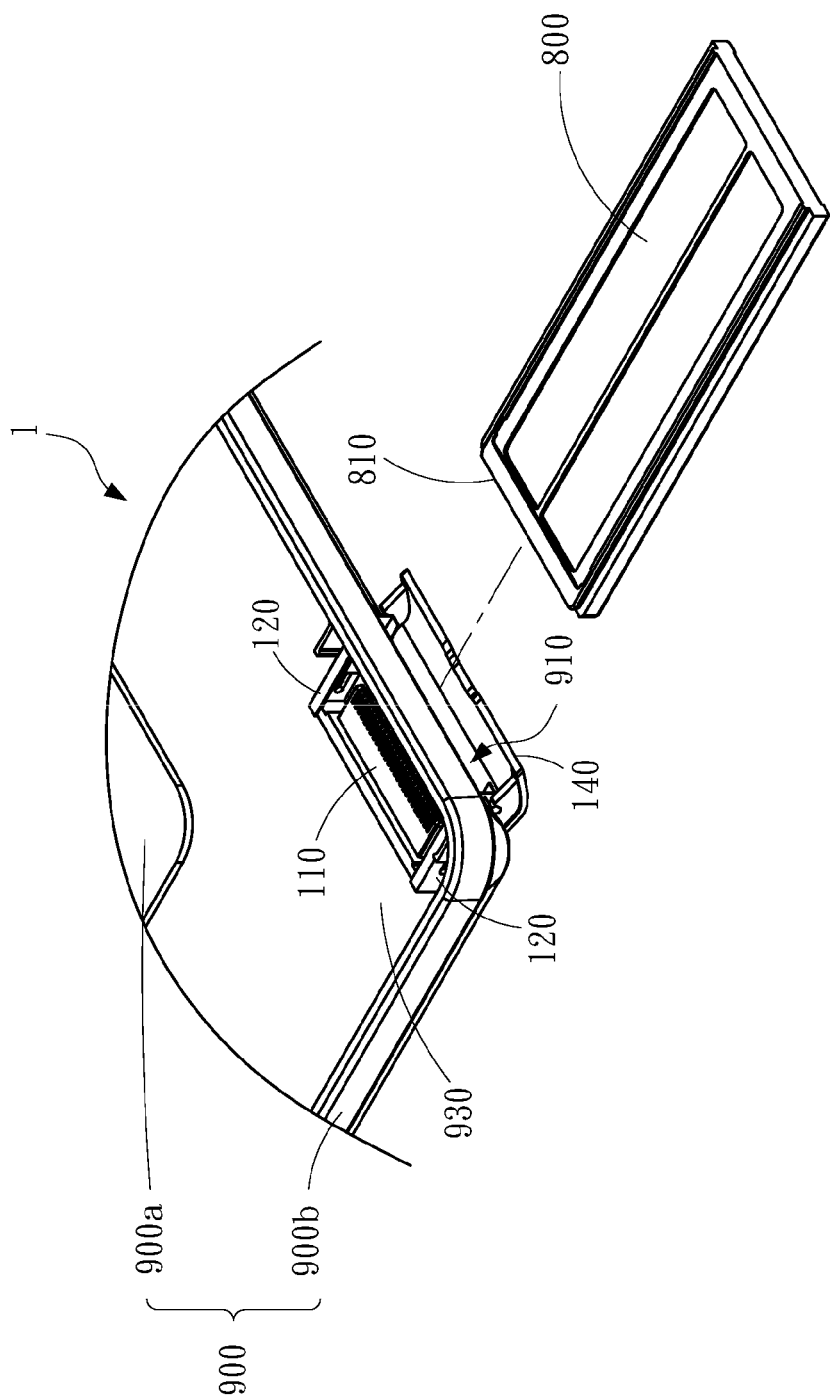
FIG. 3 is a perspective view of partial elements of an electronic device according to the first embodiment.

Please refer to FIG. 1, FIG. 2 and FIG. 3, in which a card reader 100 having a movable card insertion structure according to a first embodiment is disclosed. The card reader 100 is disposed in a case body 900a, 900b, 900 of an electronic device 1 and is adapted for connecting an electronic card 800. The ease body 900 has an insertion hole 910 for an electrical connector 810 of the electronic card 800 to pass through to he inserted into the card reader 100. The electronic device 1 includes at least one circuit board 930 disposed in the case body 900, and the card reader 100 is electrically coupled to the circuit board 930 to establish a signal communication between the electronic device 1 and the electronic card 800. The circuit board 930 usually is a main board or motherboard of the electronic device 1. In at least one example, the circuit board 930 is disposed independently and electrically connected to the main board/motherboard by a cable.

As shown in FIG. 1 and FIG. 2, the card reader 100 includes an electrical connection socket 110, at least one guiding member 120, at least one guiding rail 130, and a cover 140.

As shown in FIG. 1, FIG. 2 and FIG. 3, the electrical connection socket 110 is disposed in the case body 900 and is electrically connected to the circuit board 930. In the first embodiment, signal pins of the electrical connection socket 110 are soldered to electrical contacts of the circuit board 930, so that the electrical connection socket 110 is fixed on the circuit board 930 and meanwhile electrically connected to the circuit board 930, such that the card reader 100 inserted into the electrical connection socket 110 is electrically coupled to the circuit board 930. In some other examples of this disclosure, the electrical connection socket 110 is fixed on an inner side surface of the case body 900 and electrically connected to the circuit board 930 by a cable.

As shown in the figures, the electrical connection socket 110 is used for inserting the electrical connector 810 of the electronic card 800, so as to electrically connect the electronic card 800 to the electrical connection socket 110. The electronic card 800 includes, but not limited to, a PCMIA card, a PC Express card, a flash memory card (CF, SD, Memory Stick, xD-Picture), and a micro-drive (Micro-Drive).

As shown in FIG. 1, FIG. 2 and FIG. 3, the guiding member 120 is disposed in the case body 900 and is disposed to be corresponding to the electrical connection socket 110. The guiding member 120 provides a guiding slot 129 extending along a guiding direction X. The guiding direction X is parallel to a direction in which the electrical connector 810 is inserted into or unplugged from the electrical connection socket 110.

Figure 4:
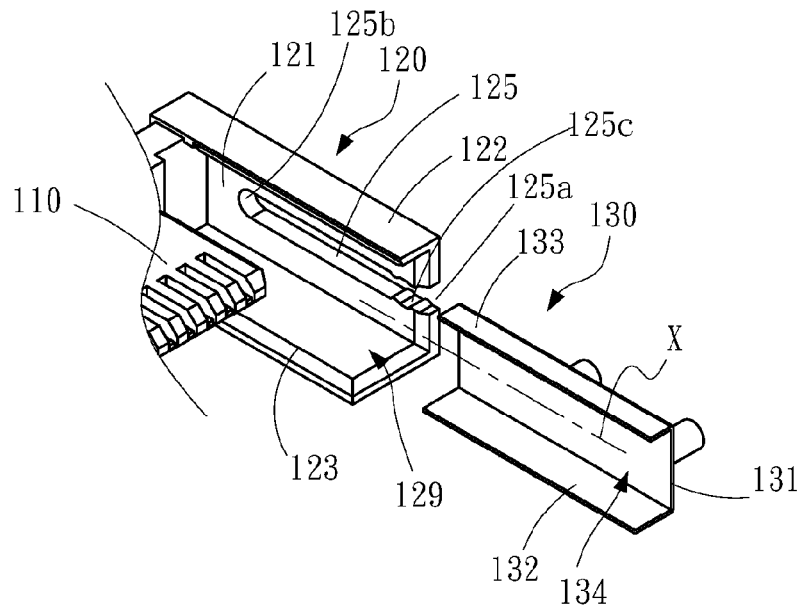
FIG. 4, FIG. 5 and FIG. 6 are enlarged views of partial elements of the card reader according to the first embodiment.

As shown in FIG. 4, in detail the guiding member 120 includes a first sidewall 121, a second sidewall 122, and a third sidewall 123. The second sidewall 122 and the third sidewall 123 respectively extend from the first sidewall 121, so that the guiding slot 129 is formed between the first sidewall 121, the second sidewall 122, and the third sidewall 123.

Figure 5:
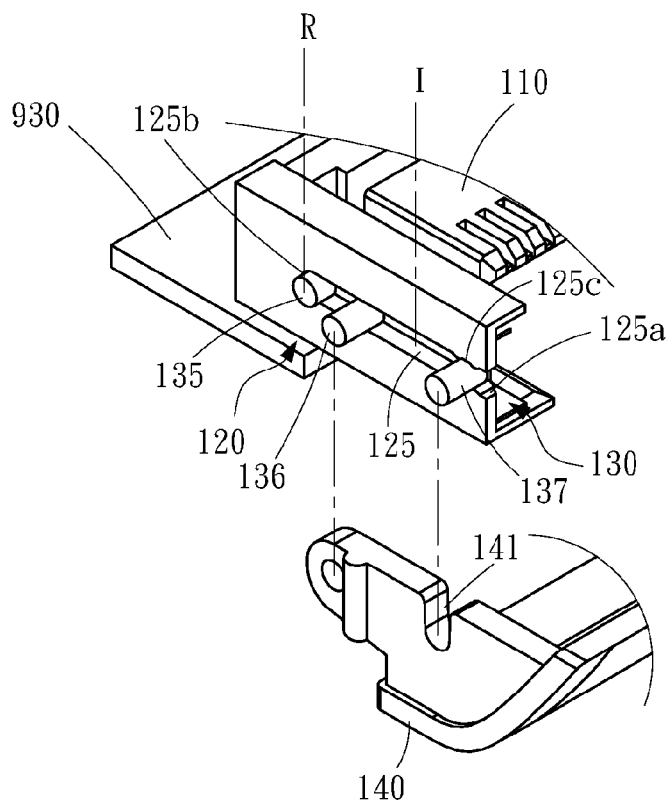
Figure 6:
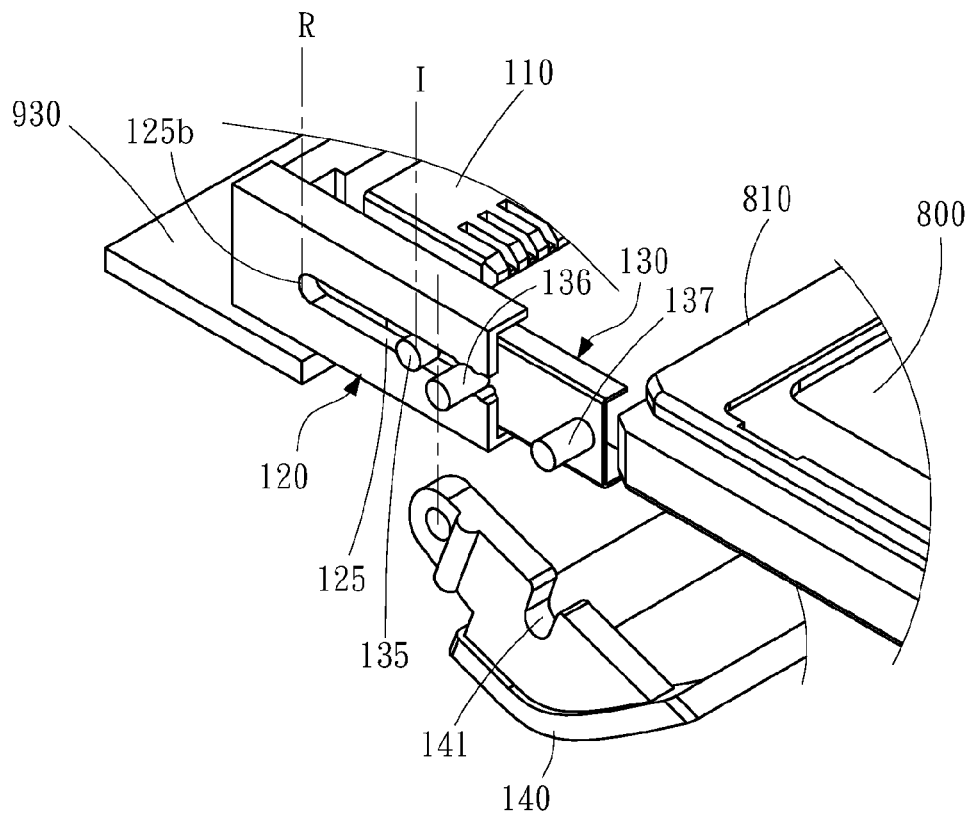

As shown in FIG. 4, FIG. 5, FIG. 6, the guiding rail 130 includes a sliding portion 131 and a lower support portion 132. The sliding portion 131 is disposed in the guiding slot 129 in a slidable manner to slide to-and-fro along the guiding direction X towards the insertion hole 910, so that the guiding rail 130 slides between a receiving position R and a card insertion position I. When the guiding rail 130 is at the receiving position R, the guiding rail 130 is accommodated in the case body 900. When the guiding rail 130 slides from the receiving position R to the card insertion position I, the guiding rail 130 moves towards the insertion hole 910. In one example of this disclosure, when the guiding rail 130 is at the card insertion position I, at least a part of the guiding rail 130 extends to the exterior of the case body 900 through the insertion hole 910.

The lower support portion 132 extends from the sliding portion 131, and is against a bottom surface of the electronic card 800 so as to support the electronic card 800. When the guiding rail 130 is at the card insertion position I, the sliding portion 131 and the lower support portion 132 guide the electronic card 800 to enter into the case body 900 through the insertion hole 910. Then the electronic card 800 is inserted into the electrical connection socket 110. Meanwhile, the lower support portion 132 also supports the electronic card 800 to avoid vibration of the electronic card 800 that may damage the electrical connection socket 110 or the electrical connector 810.

In one example, the guiding rail 130 further includes an upper support portion 133. The upper support portion 133 also extends from the sliding portion 131 and is parallel to the lower support portion 132. A clamping slit 134 is formed between the lower support portion 132 and the upper support portion 133. The clamping slit 134 just allows a side edge of the electronic card 800 to slide therein, thereby reducing the probability of the vibration of the electronic card 800. When the sliding portion 131 is disposed in the guiding slot 129 in a slidable manner, the clamping slit 134 also extends along the guiding direction X.

Generally, a single guiding rail 130 to guide and support a side edge of the electronic card 800 is sufficient for guiding the electrical connector 810 to pass through the insertion hole 910 to be inserted into the electrical connection socket 110 and providing the appropriate supporting force. Consequently, one guiding member 120 in combination with one guiding rail 130 is sufficient for guiding and support the electronic card 800. If two opposite side edges of the electronic card 800 are provide guided and supported simultaneously, the reliability of the card reader 100 is further guaranteed. Therefore, in one example, the card reader 100 includes two guiding members 120 and two guiding rails 130 for guiding and supporting two opposite side edges of the electronic card 800 at the same time.

As shown in FIG. 4, in detail the sliding portion 131 leans on the first sidewall 121, so that two opposite edges of the sliding portion 131 are respectively limited by the second sidewall 122 and the third sidewall 123, and the guide sliding portion 131 slides along the guiding direction X towards the insertion hole 910. Meanwhile, the upper support portion 133 and the lower support portion 132 respectively lean on the second sidewall 122 and the third sidewall 123.

Furthermore, the guiding member 120 further includes a guiding slit 125 formed on the first sidewall 121 and extending along a direction parallel to the guiding direction X. A first end 125a of the guiding slit 125 is corresponding to the insertion hole 910, and a second end 125b is distal from the insertion hole 910. The first end 125a is opened while the second end 125b is closed. The guiding rail 130 further includes a limiting pin 135 and a positioning pin 136, which are disposed on the sliding portion 131 for sliding in the guiding slit 125. The positioning pin 136 further protrudes to the outside of the first sidewall 121. A relative position of the limiting pin 135 and the positioning pin 136 is that the positioning pin 136 is near the insertion hole 910 and the limiting pin 135 is distal from the insertion hole 910. Furthermore, a positioning groove 125c is further formed at a position, of the guiding slit 125, near the first end 125a.

As shown in FIG. 4, FIG. 5, FIG. 6, when the guiding rail 130 is at the .receiving position R, the limiting pin 135 presses against the second end 125b of the guiding slit 125, so that the guiding rail 130 does not move towards the interior of the case body 900 further. When the guiding rail 130 is at the receiving position R, the positioning pin 136 is embedded in the positioning groove 125c, so that the guiding rail 130 does not slide further.

As shown in FIG. 1, FIG. 2, FIG. 5 and FIG. 6, the cover 140 is pivoted to the guiding rail 130, and for closing the insertion hole 910. In one example, the cover 140 is connected to the positioning pin 136 in a rotatable manner, so as to rotate to open or close the insertion hole 910.

Furthermore, an engaging notch 141 is further disposed at the edge of the cover 140 and the guiding rail 130 further includes an engaging pin 137 adapted to be embedded in the engaging notch 141, so that the cover 140 remains in a closing state the insertion hole 910.

The relative position of the engaging pin 137 and the positioning pin 136 is that the engaging pin 137 is near the insertion hole 910 and the positioning pin 136 is distal from the insertion hole 910. When the guiding rail 130 is at the receiving position R, the engaging pin 137 passes through the first end 125a of the guiding slit 125 to be embedded in the positioning groove 125c. The engaging pin 137 further protrudes to the outside of the first sidewall 121. Thus, the cover 140 can be rotated to the closing state for closing the insertion hole 910, and the engaging pin 137 is embedded in the engaging notch 141 to fix the cover 140.

Figure 7:
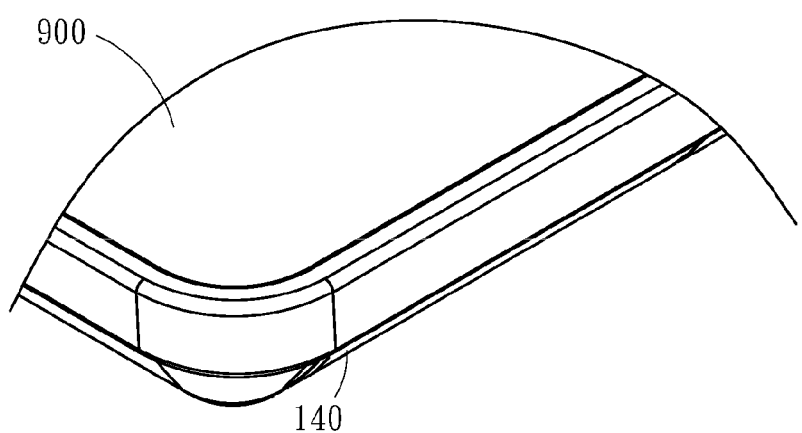
FIG. 7 and FIG. 8 are partial perspective views of the electronic device according to the first embodiment.
Figure 8:
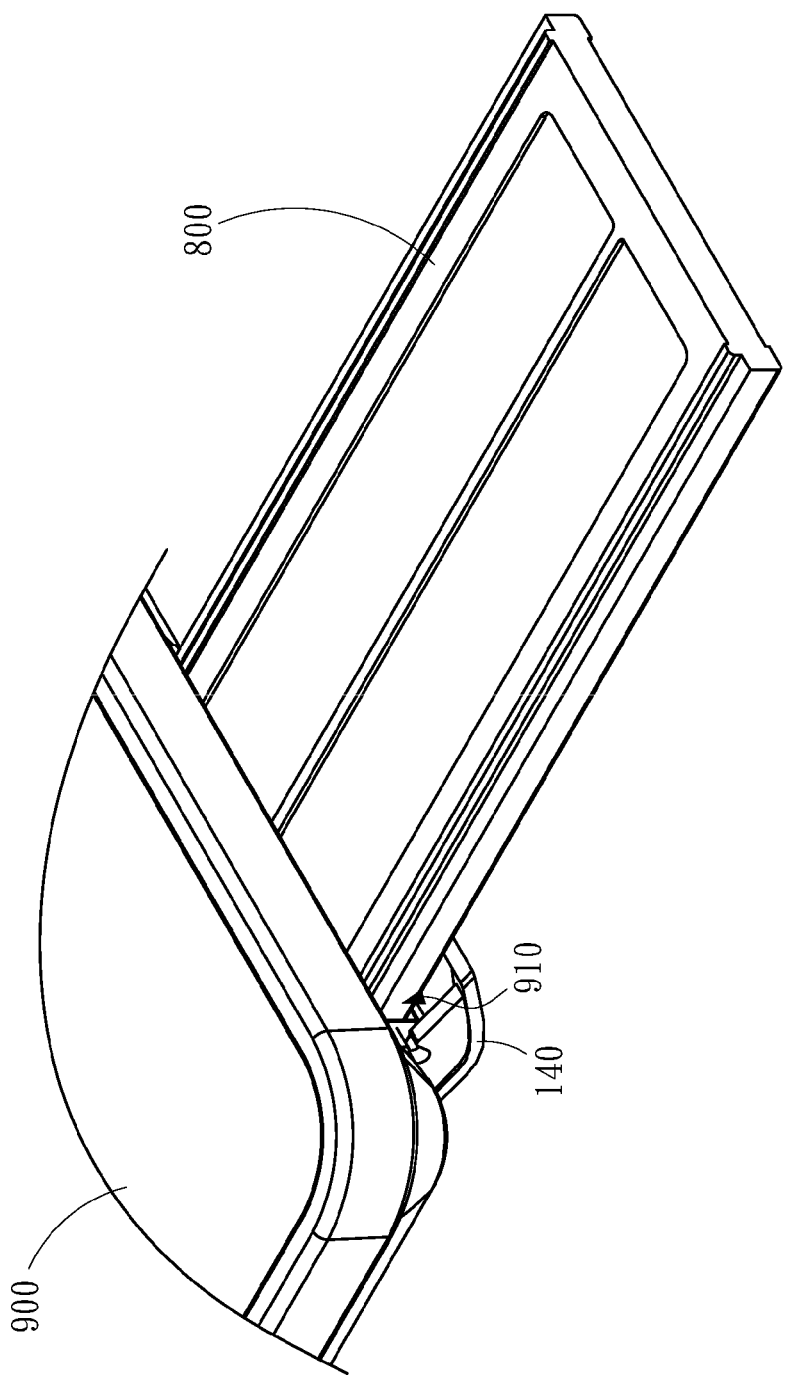

Please refer to FIG. 5 and FIG. 7, in which when the electronic card 800 is not connected to the electronic device 1, the guiding rail 130 slides to the receiving position R. The cover 140 is rotated to the closing state for closing the insertion hole 910. At this point, the electronic device 1 remains the original appearance, and the insertion hole 910 is closed by the cover 140, protecting the electrical connection socket 110.

Furthermore, the whole structure of the card reader is disposed close to an inner wall. surface of the case body 900 without reserving a space for inserting the electronic card 800 to the interior of the case body 900, and still has the function of guiding the electronic card 800 to be connected to the electrical connection socket 110, while reducing the space occupied by the card reader 100.

Please refer to FIG. 2, FIG. 3, FIG. 6 and FIG. 8, in which when the electronic card 800 is inserted into the electronic device 1, the cover 140 is firstly rotated to the opening state for opening the insertion hole 910. Then, a user pulls the cover 140 outwards or directly pulls the guiding rail 130, and the guiding rail 130 moves to the card insertion position I.

Next, the user aligns the electronic card 800 with the insertion hole 910 to make the edge of the electronic card 800 leans on the guiding rail 130 to guide the electronic card 800 with the guiding rail 130. Finally, under the guidance of the guiding rail 130, the electrical connector 810 of the electronic card 800 is inserted into the electrical connection socket 110. Meanwhile, one side edge or two side edges of the electronic card 800 are supported by the guiding rail 130.

Figure 9:
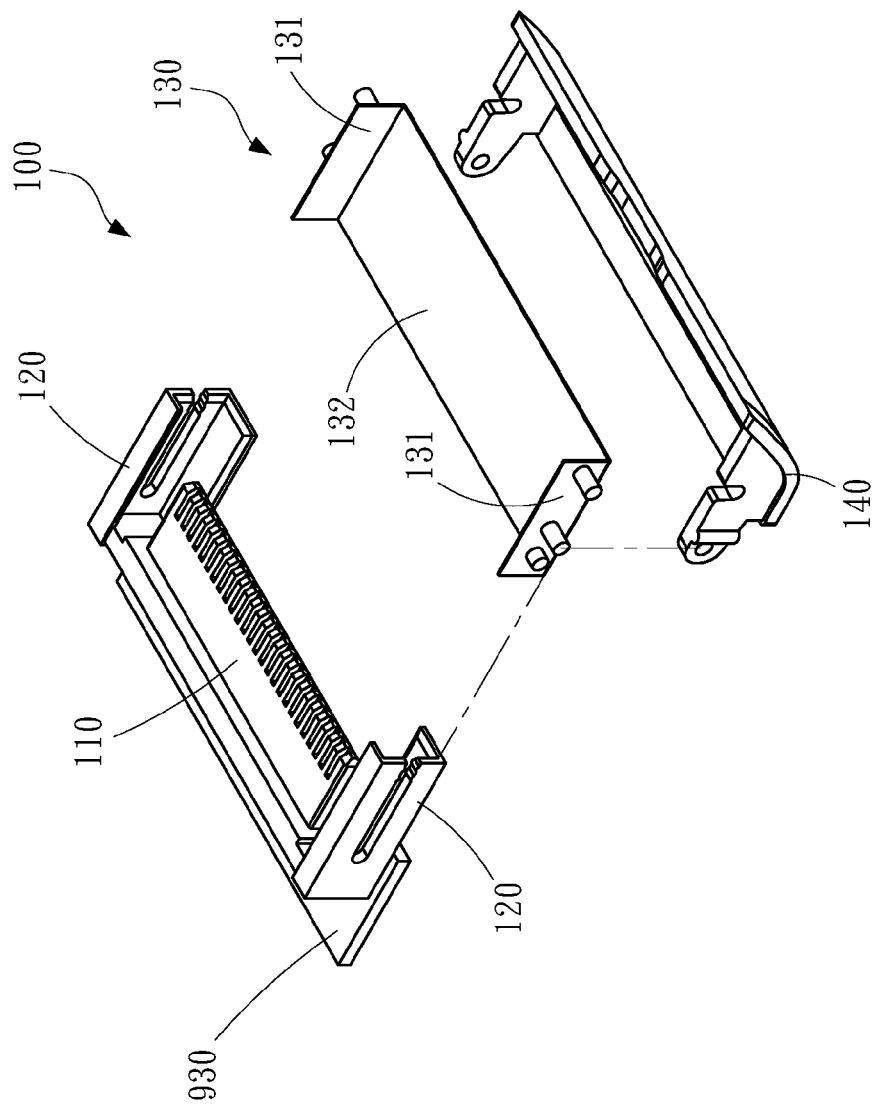
FIG. 9 is an exploded view of a card reader according to a second embodiment.
Figure 10:
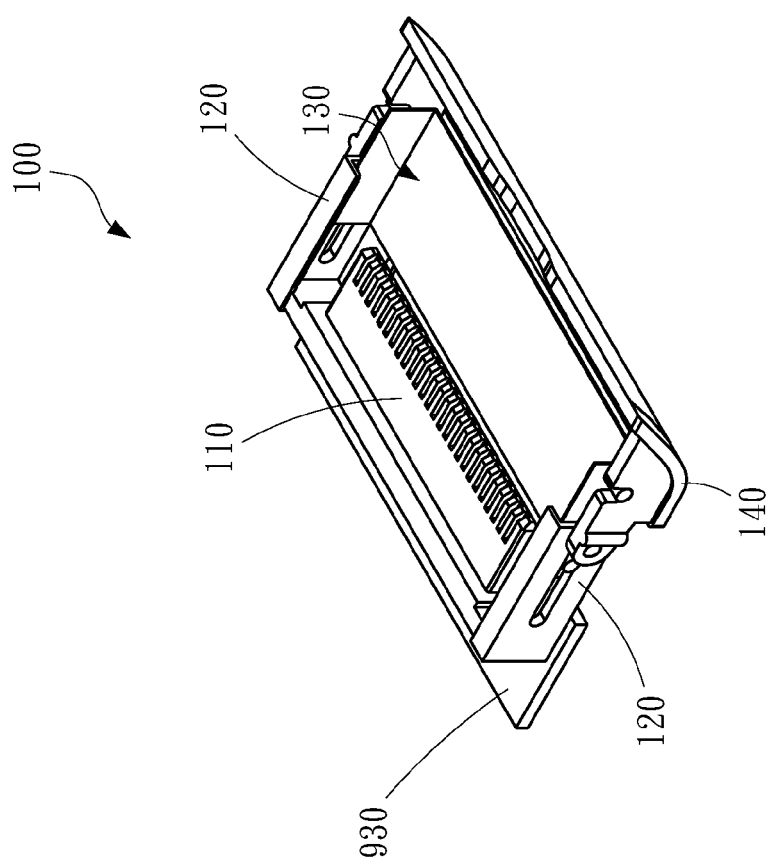
FIG. 10 is a perspective view of the card reader and an electronic card according to the second embodiment.

Please refer to FIG. 9 and FIG. 10, in which a card reader 100 having a movable card insertion structure according to a second embodiment is disclosed.

In the second embodiment, the card reader 100 includes an electrical connection socket 110, two guiding members 120, a guiding rail 130, and a cover 140. The electrical connection socket 110, the two guiding members 120 and the cover 140 are substantially the same as those of the first embodiment.

As shown in FIG. 9 and FIG. 10, the guiding rail 130 includes two sliding portions 131 and a lower support portion 132.

The two sliding portions 131 are respectively disposed in two guiding slots 129 in a slidable manner. The lower support portion 132 connects the two sliding portions 131. The lower support portion 132 presses against the bottom surface of the electronic card 800 with a relatively large contact area, so as to provide a relatively large supporting force for the electronic card 800. The lower support portion 132 in the second embodiment further facilitates guiding the electronic card 800 to pass through the insertion hole 910 and enter into the case body 900.

Figure 11:
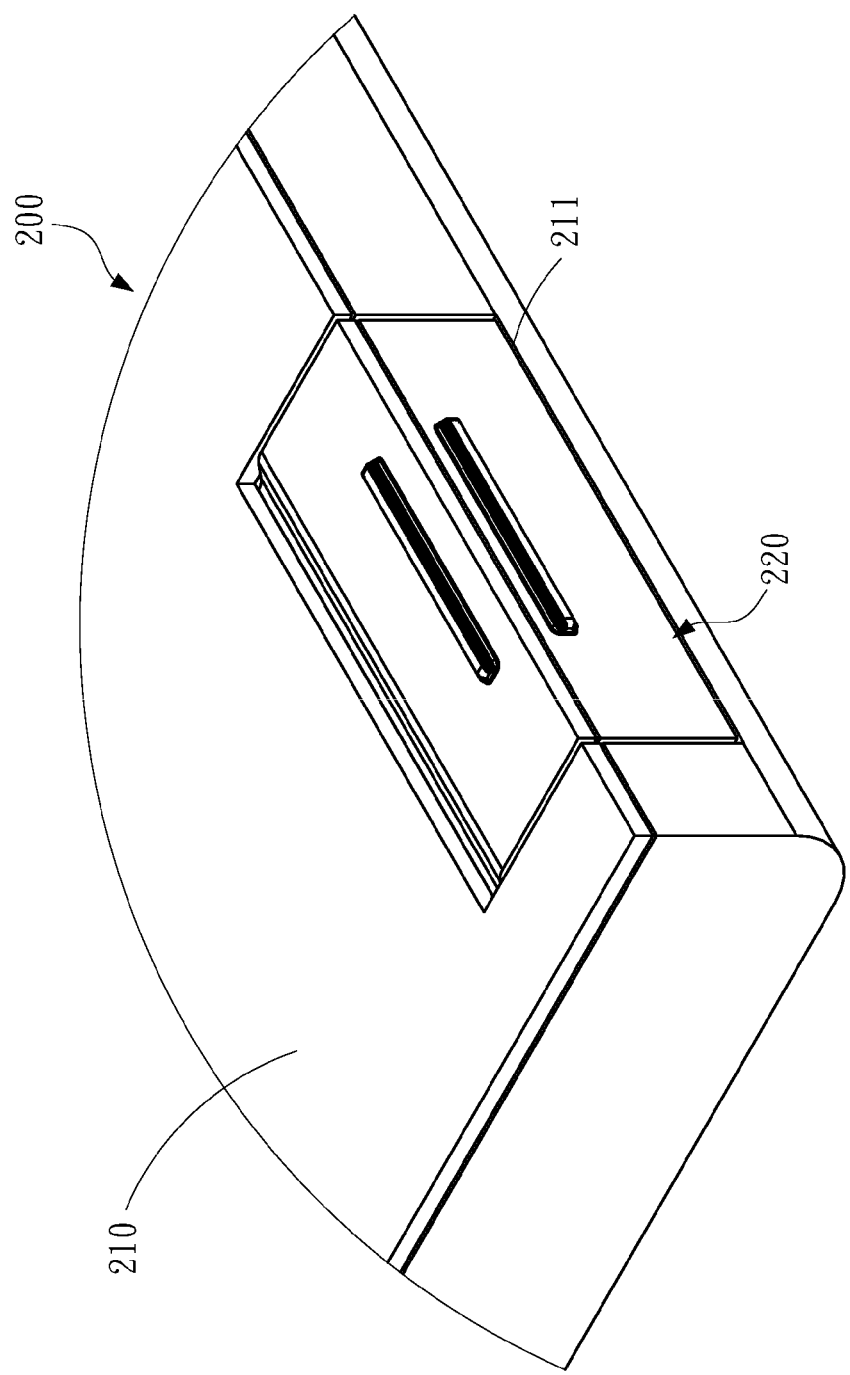
FIG. 11 and FIG. 12 are partial perspective views of an electronic device according to a third embodiment.
Figure 12:
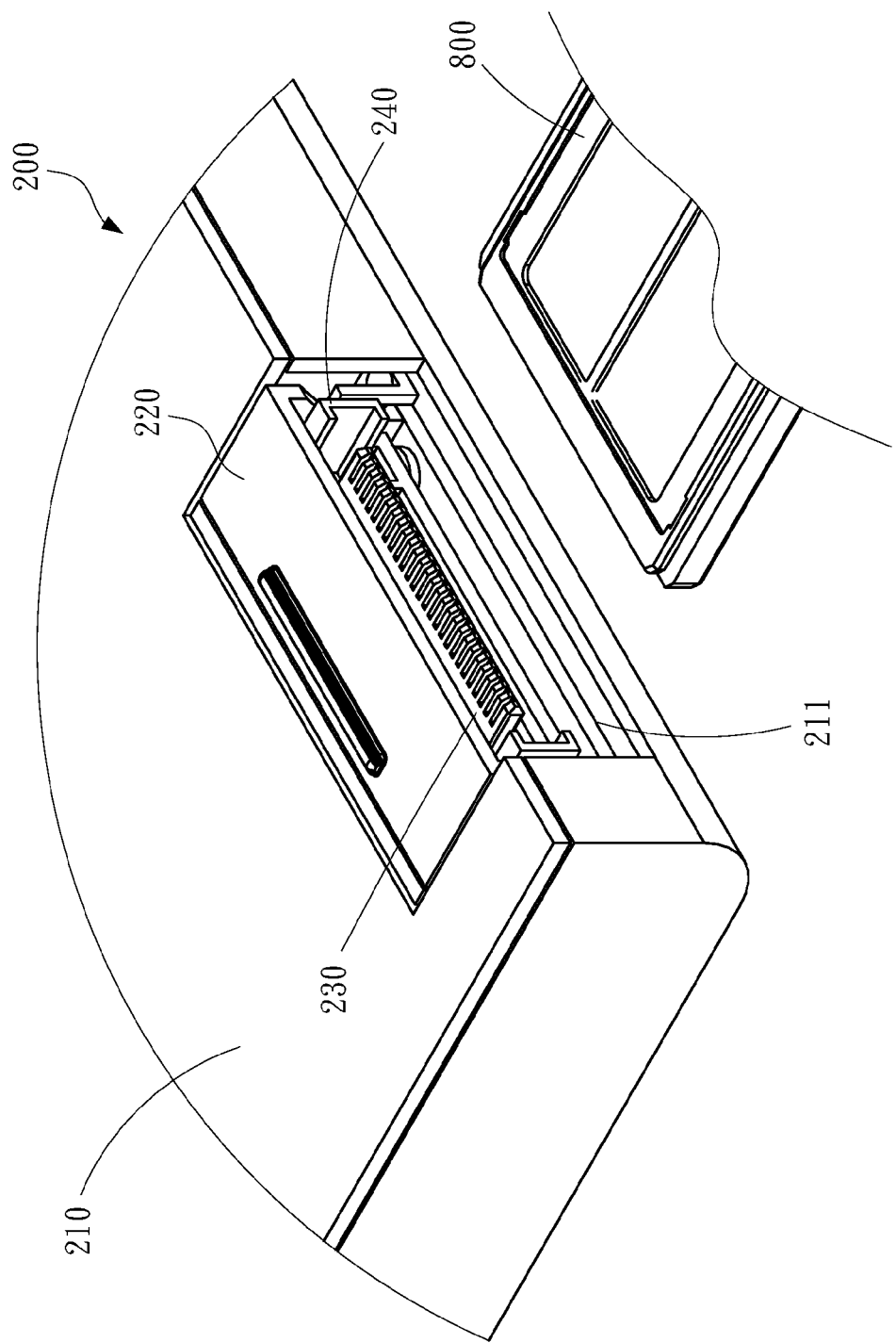

Please refer to FIG. 11 and FIG. 12, in which an electronic device 200 having a movable card insertion structure according to a third embodiment is disclosed. The electronic device 200 includes a case body 210, a rotary cover 220, an electrical connection socket 230, and a guiding member 240.

Please refer to FIG. 11 and FIG. 12, in which the case body 210 has a window 211 for communicating the interior and the exterior of the case body 210. The rotary cover 220 is pivoted to the case body 210 and is located at the window 211.

Figure 13:
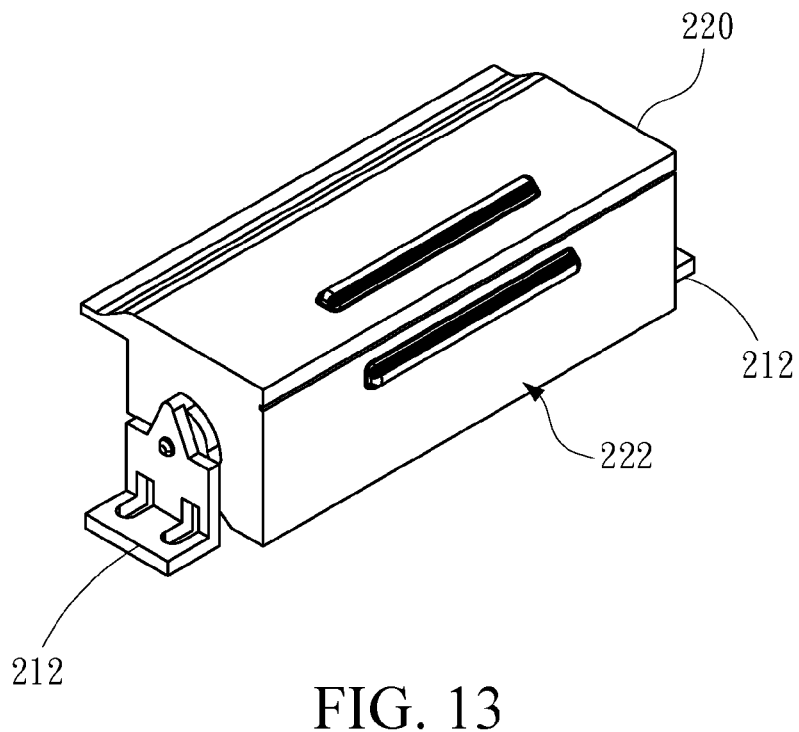
FIG. 13 and FIG. 14 are enlarged views of partial elements of a card reader according to the third embodiment.
Figure 14:
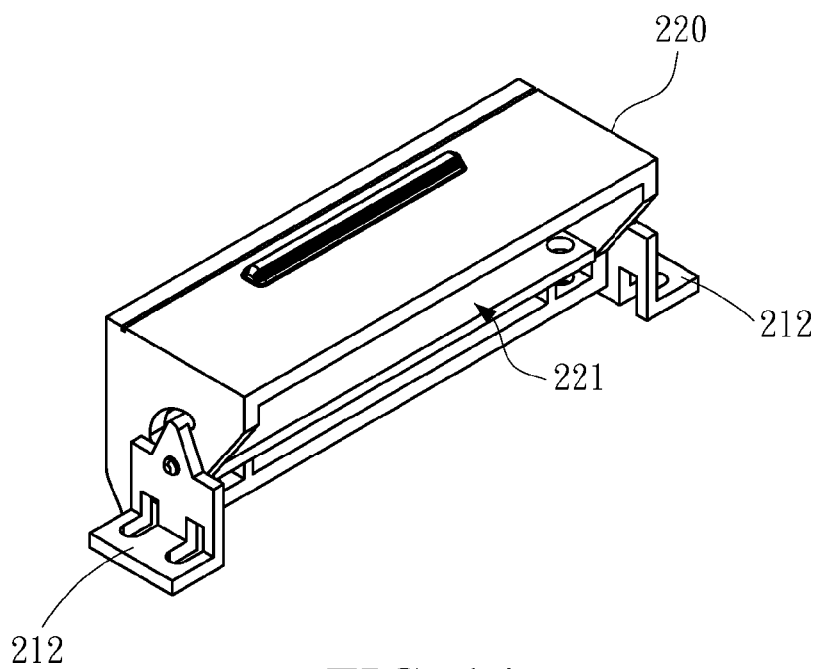

As shown in FIG. 13 and FIG. 14, the rotary cover 220 has an inner side surface 221 and an outer side surface 222. In one example, the inner side surface 221 is concave and the outer side surface 222 is convex. The rotary cover 220 may be rotated to a closing state and an opening state. In the third embodiment, the case body 210 further includes two pivoting seats 212, which are disposed in the case body, located at the edge of the window. The middle positions of two opposite side edges of the rotary cover 220 are pivoted to the pivoting seats 212 respectively, therefore the middle section of the rotary cover 220 is pivoted to the case body 210 and the rotary cover 220 may be flipped front and back between the closing state and the opening state. In the closing state, the inner side surface 221 faces the interior of the case body 210, and the rotary cover 220 closes the window 211. In the opening state, the inner side surface 221 faces the outside of the case body 210 and the outer side surface 222 faces the interior of the case body 210. In the opening state, the rotary cover 220 closes or half-closes the window 211.

Figure 15:
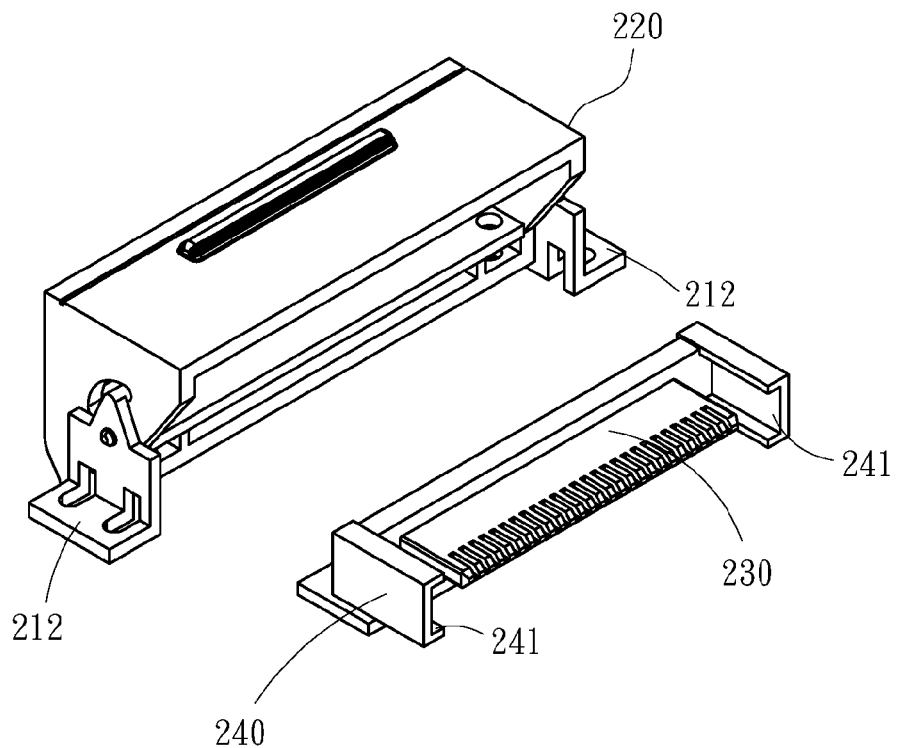
FIG. 15 is an exploded view of the card reader according to the third embodiment.
Figure 16:
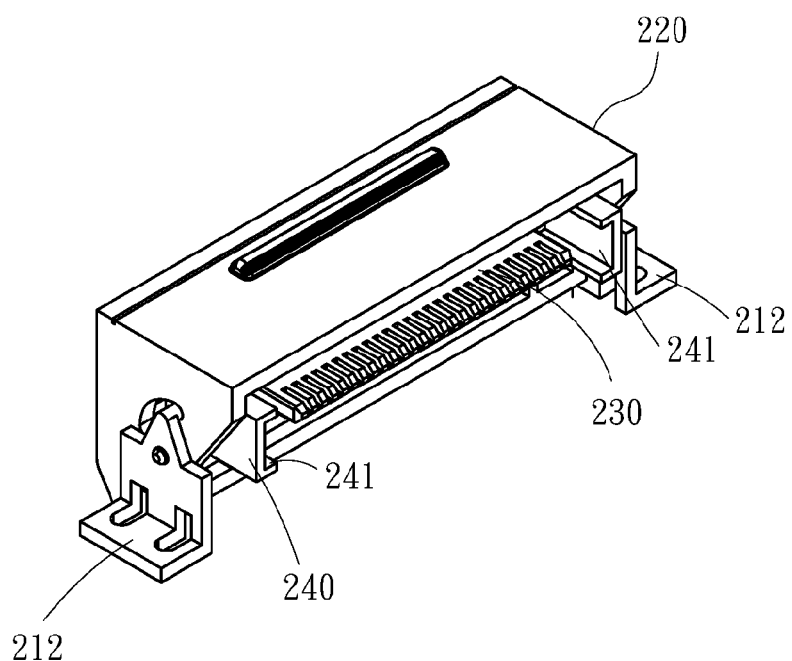
FIG. 16 is a perspective view of the card reader according to the third embodiment.

Please refer to FIG. 15 and FIG. 16, in which the electrical connection socket 230 is disposed on the inner side surface 221 of the rotary cover 220 and is electrically connected to the electronic circuit of the electronic device by a cable. The electrical connection socket 230 is used for inserting the electrical connector 810 of the electronic card 800, so as to establish a communication between the electronic card 800 and the electronic device 200.

Please refer to FIG. 15 and FIG. 16, in which the guiding member 240 is disposed on the inner side surface 221 of the rotary cover 220. The guiding member 240 provides at least one guiding slot 241 matching an electrical connector 810 of the electronic card 800, and the electrical connection socket 230 is disposed corresponding to the guiding slot 241. The guiding slot 241 is used for inserting the electrical connector 810 of the electronic card 800 and guiding the electrical connector 810 to the electrical connection socket 230, so that the electrical connector 810 is inserted into the electrical connection socket 230.

Please refer to FIG. 11 and FIG. 13, in which when the electronic card 800 is not connected to the electronic device 200, the rotary cover 220 is rotated to the closing state. At this point, the inner side surface 221 of the rotary cover 220 faces the interior of the case body 210, and the outer side surface 222 faces the exterior of the case body 210. The electrical connection socket 230 and the guiding member 240 are hidden between the inner side surface 221 of the rotary cover 220 and the case body 210, and meanwhile the outer side surface 222 of the rotary cover 220 and the outer contour of the case body 210 are joined. The electronic device 200 remains the original appearance, and the rotary cover 220 also protects the electrical connection socket 230.

Furthermore, When the rotary cover 220 is rotated to the closing state, the position of the electrical connection socket 230 is close to an inner wall of the case body 210. Therefore, the space inside the case body 210 occupied by the electrical connection socket 230 or the card reader may be reduced.

Please refer to FIG. 12 and FIG. 16, when the electronic card 800 is inserted into the electronic device 200, the rotary cover 220 is firstly rotated to the opening state. At this point, the outer side surface 222 of the rotary cover 220 faces the interior of the case body 210, and the inner side surface 221 faces the exterior of the case body 210. The electrical connection socket 230 and the guiding member 240 are exposed. At this point, the opening of the guiding slot 241 faces the outside of the case body 210 for inserting the electrical connector 810 of the electronic card 800 therein, which is further inserted into the electrical connection socket 230.

Figure 17:
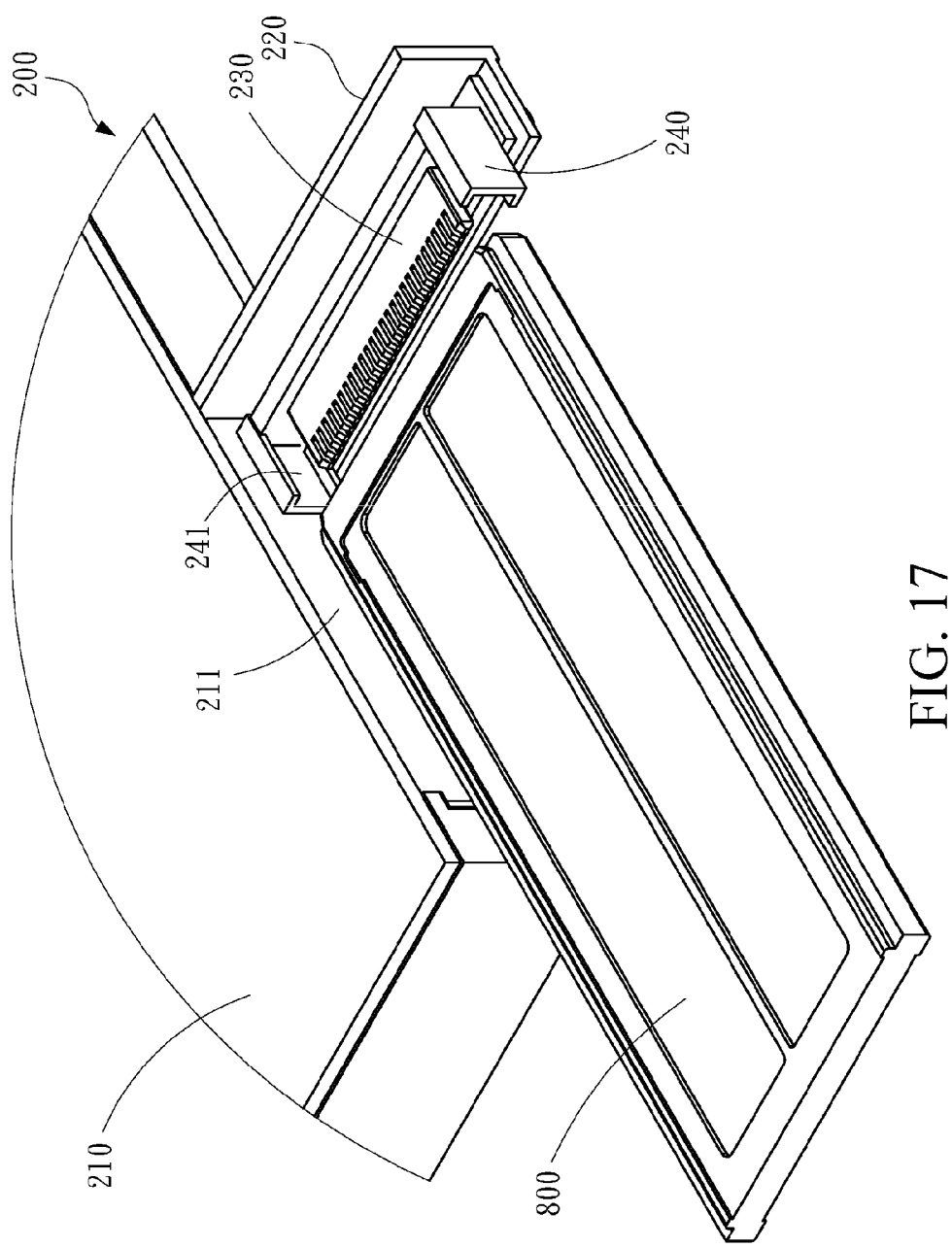
FIG. 17, FIG. 18 and FIG. 19 are partial perspective views of an electronic device according to a fourth embodiment.
Figure 18:
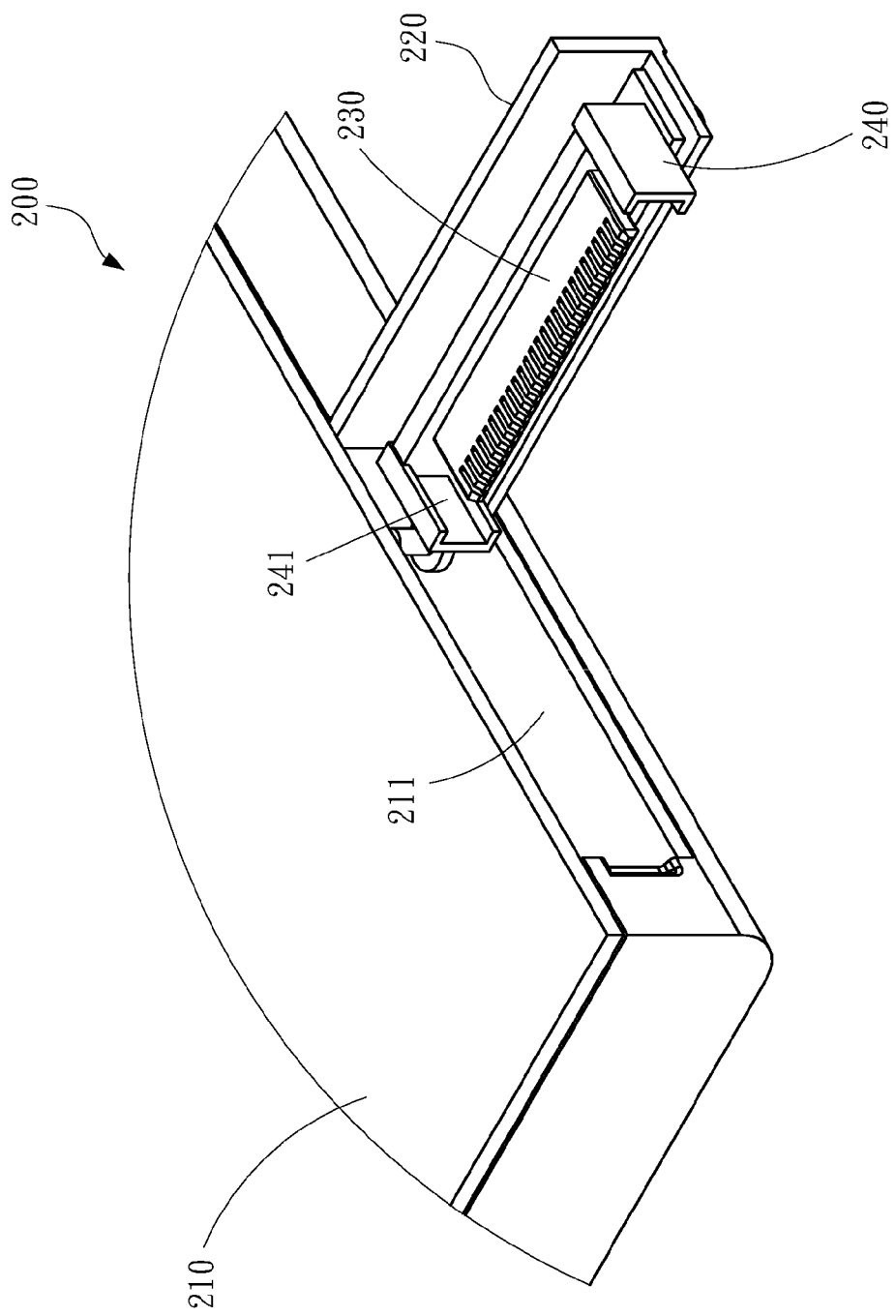

Please refer to FIG. 17, FIG. 18 and FIG, 19, in which an electronic device 200 having a movable card insertion structure according to a fourth embodiment is disclosed. The electronic device 200 includes a case body 210, a rotary cover 220, an electrical connection socket 230, and a guiding member 240.

Figure 19:
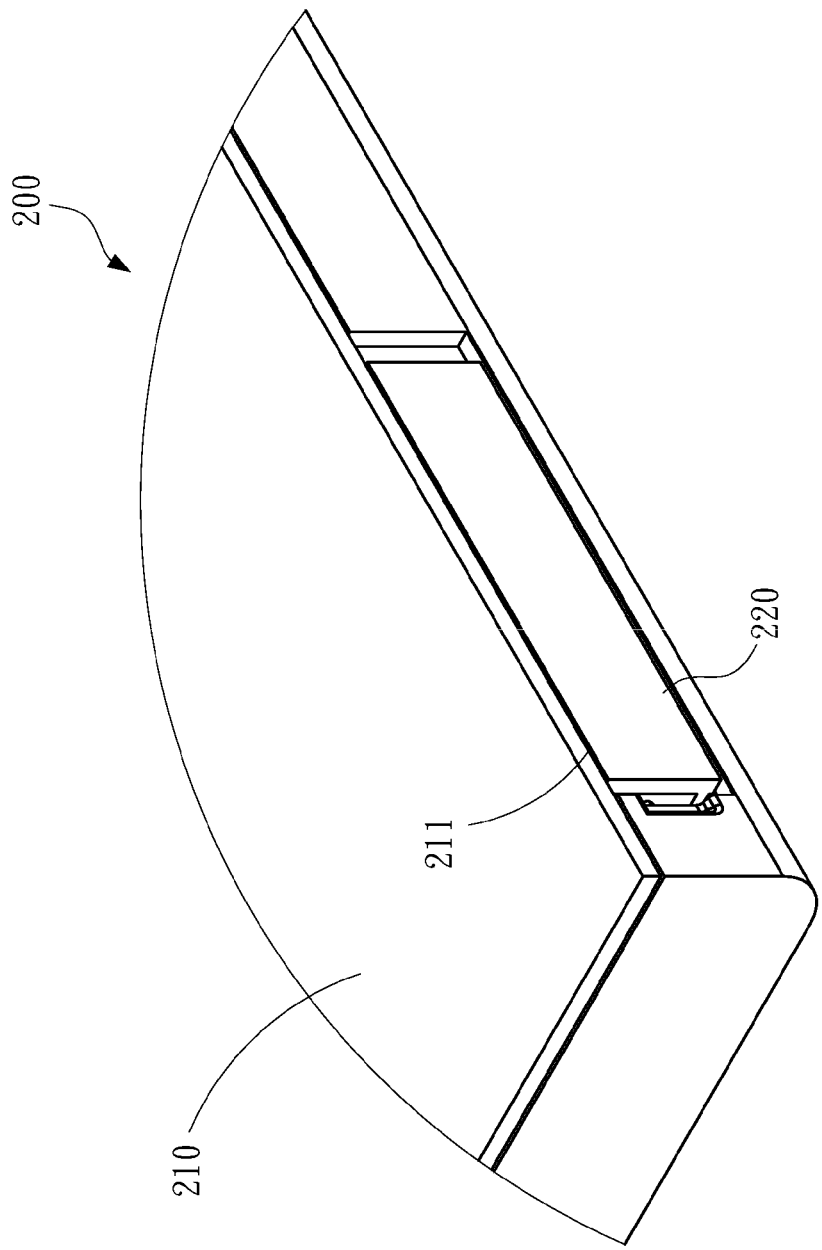

As shown in FIG. 17, FIG. 18 and FIG. 19, the case body 210, the electrical connection socket 230 and the guiding member 240 of the fourth embodiment are substantially the same as those of the third embodiment. The fourth embodiment provides a modification of the rotary cover 220.

The rotary cover 220 of the fourth embodiment also has an inner side surface 221 and an outer side surface 222. In one example, the inner side surface 221 is concave and the outer side surface 222 is convex. In another example, the rotary cover 220 is a flat plate, so that the inner side surface 221 and the outer side surface 222 are all planes. The rotary cover 220 may be rotated to a closing state and an opening state.

In the fourth embodiment, a side edge of the rotary cover 220 is pivoted to an edge of the window 211 of the case body 210. In the closing state, the inner side surface 221 faces the interior of the case body 210, and the rotary cover 220 closes the window 211. In the opening state, the inner side surface 221 may face any direction directed to the exterior the case body 210 and the rotary cover 220 is a door that is closed or opened outwardly.

Likewise, when the electronic card 800 is not connected to the electronic device 200, the rotary cover 220 is rotated to the closing state. At this point, the electrical connection socket 230 and the guiding member 240 are hidden between the inner side surface 221 of the rotary cover 220 and the case body 210.

Please refer to FIG. 17, FIG. 18 and FIG. 19, in which when the electronic card 800 is inserted into the electronic device 200, the rotary cover 220 is firstly rotated to the opening state. At this point, the guiding slot 241 is fully exposed and is not blocked by the case body 210, so that the electrical connector 810 of the electronic card 800 is not interfered with by the case body 210 when inserted into the guiding slot 241.

While the present invention includes been described by the way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation in order to encompass all such modifications and similar arrangements.

The invention claimed is:

1. An electronic device having movable card insertion mechanism, comprises:
   a case body, having a window for communicating an interior and an exterior of the case body;
   a rotary cover, pivoted to the case body and located at the window, wherein the rotary cover is provided be rotated to a closing state and an opening state, the rotary cover has an inner side surface and an outer side surface; and in the closing state the inner side surface faces the interior of the case body, and in the opening state the inner side surface faces the exterior of the case body and the outer side surfaces faces the interior of the case body;
   an electrical connection socket, disposed on an inner side surface of the rotary cover; and
   a guiding member, disposed on the inner side surface of the rotary cover and providing at least one guiding slot, wherein the electrical connection socket is disposed corresponding to the guiding slot.

\* \* \* \* \*